US011842212B2

(12) United States Patent
Duggirala

(10) Patent No.: US 11,842,212 B2
(45) Date of Patent: Dec. 12, 2023

(54) SYSTEMS AND METHODS FOR SOFTWARE DEPLOYMENT INTERVAL PREDICTION

(71) Applicant: Mastercard International Incorporated, Purchase, NY (US)

(72) Inventor: Chandra Sekhar Duggirala, St. Louis, MO (US)

(73) Assignee: Mastercard International Incorporated, Purchase, NY (US)

( * ) Notice: Subject to any disclaimer, the term of this patent is extended or adjusted under 35 U.S.C. 154(b) by 468 days.

(21) Appl. No.: 16/784,530

(22) Filed: Feb. 7, 2020

(65) Prior Publication Data

US 2021/0248001 A1    Aug. 12, 2021

(51) Int. Cl.
| | | |
|---|---|---|
| G06F 9/48 | (2006.01) | |
| G06Q 10/20 | (2023.01) | |
| G06N 5/022 | (2023.01) | |
| H04L 41/147 | (2022.01) | |
| G06Q 10/0631 | (2023.01) | |
| G06F 8/65 | (2018.01) | |

(52) U.S. Cl.
CPC .......... *G06F 9/4881* (2013.01); *G06N 5/022* (2013.01); *G06Q 10/06315* (2013.01); *G06Q 10/20* (2013.01); *H04L 41/147* (2013.01); *G06F 8/65* (2013.01)

(58) Field of Classification Search
CPC ....................... G06F 9/4881; G06Q 10/06315; G06Q 10/20; G06N 5/022; G06N 20/00; H04L 41/147; H04L 41/082
See application file for complete search history.

(56) References Cited

U.S. PATENT DOCUMENTS

| | | | |
|---|---|---|---|
| 6,446,123 | B1 | 9/2002 | Ballantine et al. |
| 6,944,630 | B2 * | 9/2005 | Vos ..................... G06F 16/2453 |
| 7,440,973 | B2 | 10/2008 | Tsukerman et al. |
| 8,185,899 | B2 * | 5/2012 | Daly ..................... G06F 9/4881 |
| | | | 718/103 |
| 8,635,618 | B2 | 1/2014 | Aggarwal et al. |
| 9,170,840 | B2 | 10/2015 | Bozek et al. |
| 9,229,773 | B1 * | 1/2016 | Snow ..................... G06F 9/4881 |
| 9,959,138 | B1 * | 5/2018 | Vaish ..................... G06F 9/4881 |
| 10,187,492 | B2 * | 1/2019 | Thomas ................. H04L 67/22 |
| 11,159,387 | B1 * | 10/2021 | Klinger ................. H04L 41/147 |
| 11,405,280 | B2 * | 8/2022 | Nataraj ................. H04L 41/145 |
| 11,411,923 | B2 * | 8/2022 | Subbarayan ........ H04L 63/0807 |
| 2006/0026212 | A1 * | 2/2006 | Tsukerman ............. G06F 16/21 |
| 2008/0178186 | A1 * | 7/2008 | Capek ................... G06F 9/4843 |
| | | | 718/103 |
| 2012/0265691 | A1 | 10/2012 | Chowdhury et al. |
| 2013/0219163 | A1 | 8/2013 | Sayers et al. |
| 2020/0045519 | A1 * | 2/2020 | Raleigh ................. H04M 15/80 |
| 2021/0248001 | A1 * | 8/2021 | Duggirala ............. H04L 41/082 |
| 2022/0292190 | A1 * | 9/2022 | Subbarayan ........ H04L 63/1441 |

\* cited by examiner

*Primary Examiner* — Dylan C White
(74) *Attorney, Agent, or Firm* — Hovey Williams LLP

(57) ABSTRACT

The disclosure includes systems and methods for determining a change window for taking an application off-line. The systems and methods include mapping application programming interfaces (APIs) to one or more applications, and based on the API mapping, determining a priority level for each of the applications. A network traffic volume for each of the APIs mapped to the applications is predicted. Based on the predicted network traffic volume and the priority level of each of the applications, the systems and methods determine a change window for taking the applications off-line.

18 Claims, 6 Drawing Sheets

SYSTEMS AND METHODS FOR SOFTWARE DEPLOYMENT INTERVAL PREDICTION

FIELD OF THE DISCLOSURE

The present disclosure relates to systems and methods for determining change windows, and in particular, for determining a change window for taking an application off-line based on a priority level of the application and a predicted network traffic volume.

BACKGROUND

Networks, such as payment networks, implement numerous database applications and application programming interfaces (APIs) to perform various payment or financial operations. Often, the database applications need to be updated, upgraded, and/or have maintenance performed to maintain the operations of the payment network. Scheduling off-line time for applications can be difficult because payment networks operate twenty-four (24) hours a day in a global environment.

In addition, external customers of payment networks, such as merchants and card issuers, may have planned promotions or events that can result in additional network load on the payment system. These promotions or events may not be communicated to the payment networks in advance, and as such, if one of the applications is scheduled to go off-line during such a promotion or event, the customer may experience a downgrade in network performance.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method is provided. The method includes mapping one or more application programming interfaces (APIs) to one or more applications. In addition, the method includes, based on the API mapping, determining a priority level for each of the applications. Furthermore, the method includes predicting a network traffic volume for each of the APIs mapped to the applications. Moreover, the method includes, based on the predicted network traffic volume for each of the APIs and the priority level of each of the applications, determining a change window for taking the applications off-line.

In another aspect, a computing system is provided. The computing system includes an application programming interface (API) system having a plurality of APIs, a data center server including a plurality of applications, and a historical database including historical network traffic data corresponding to the plurality of APIs, the plurality of applications, and the data center server. The computing system also includes an off-line scheduler including a processor in communication with the API system, data center server, and historical database. The processor is programmed to map each API of the plurality of APIs to one or more of the plurality of applications. The processor is also programmed to, based on the API mapping, determine a priority level for each of said applications and to predict a network traffic volume for each of the APIs mapped to the applications. Based on the predicted network traffic volume for each of the APIs and the priority level of each of the applications, the processor is programmed to determine a change window for taking the applications off-line.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
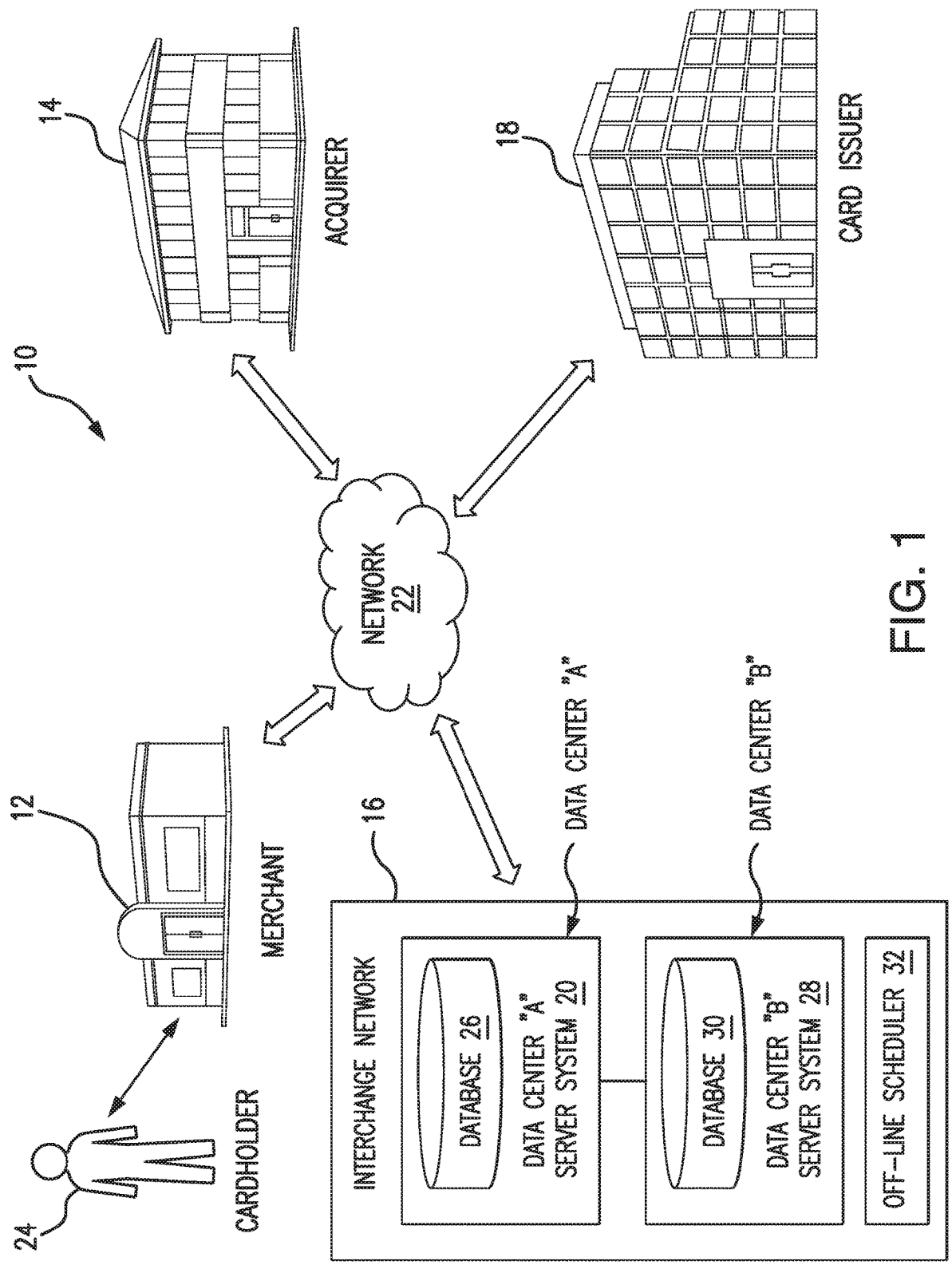
FIG. 1 is a block diagram of an example multi-party payment card network system, including a first and second data center and an off-line scheduler, in accordance with one embodiment of the disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting.

The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Broadly characterized, the present disclosure relates to systems and methods for determining a change window for taking an application off-line. An off-line scheduler monitors a plurality of application programming interfaces (APIs) and applications to determine the relationships therebetween. That is, the off-line scheduler maps the APIs to the applications. The off-line scheduler then determines a priority level for each application based on the APIs that map thereto. For example, if an API that maps to a respective application is a single point of failure (SPOF) API, then the associated application receives a priority level one (1) designation. Otherwise the application receives a priority level two (2) designation. Historical network traffic data associated with each of the APIs is analyzed using a regression model to determine one or more functions for predicting future traffic. During a predetermined service period, the functions are applied to predict the traffic at the APIs and, based on the prediction and the priority levels, a change window is defined for taking the applications offline.

Exemplary Network System

FIG. 1 is a block diagram of an example multi-party payment card network system 10, including a data center A, a data center B, and an off-line scheduler 32. The payment card network system 10 facilitates providing interchange network services offered by an interchange network 16. In addition, the payment card network system 10 enables payment card transactions in which merchants 12, acquirers 14, and/or card issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

In the example embodiment, the payment card network system 10 generally includes the merchants 12, the acquirers 14, the interchange network 16, and the issuers 18 coupled in communication via a network 22. The network 22 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 22 may include more than one type of network, such as a private payment transaction network provided by the interchange network 16 to the acquirers 14 and/or the issuers 18, and separately, the public Internet, which may facilitate communication between the merchants 12, the interchange network 16, the acquirers 14, and/or cardholders 24.

Embodiments described herein may relate to a transaction card system, such as a credit card payment system using the Mastercard® interchange network. (Mastercard is a registered trademark of Mastercard International Incorporated). The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 10.

In a typical transaction card system, a financial institution called the "issuer" issues a transaction card, such as a credit card, to a cardholder or consumer 24, who uses the transaction card to tender payment for a purchase from the merchant 12. In the example embodiment, the merchant 12 is typically associated with products, for example, and without limitation, goods and/or services, that are offered for sale and are sold to the cardholders 24. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the payment card network system 10. This financial institution is usually called the "merchant bank," the "acquiring bank," or the acquirer 14. When the cardholder 24 provides payment for a purchase with a transaction card, the merchant 12 requests authorization from the acquirer 14 for the purchase amount. The request may be performed over the telephone but is usually performed using a point-of-sale terminal that reads the cardholder's account information from a magnetic stripe, a chip, or embossed characters on the transaction card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase transaction is covered by the cardholder's available credit line. Based on these determinations, the request for authorization will be declined or accepted. If the request is accepted, an authorization code is issued to the merchant 12. Each of these transactions may be stored by the interchange network 16 in one or more tables (not shown) that make up one or more databases, such as databases 26 and 30. It is noted that the databases 26 and 30, described herein, may be database servers and may be discrete servers distributed remotely from one another.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 24 cancels a transaction before it is captured, a "void" is generated. If the cardholder 24 returns goods after the transaction has been captured, a "credit" is generated. The interchange network 16 and/or the issuer 18 stores the transaction data, such as, and without limitation, payment account number (PAN), a type of merchant, a merchant identifier, a location where the transaction was completed, an amount of purchase, a merchant category code, a date and time of the transaction, products purchased and related descriptions or identifiers, etc., in a transaction database, such as the databases 26 and 30.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settling, may be included in the transaction data, and stored within the databases 26 and 30, at the merchant 12, the acquirer 14, the payment network 16, and/or the issuer 18. Further, transaction data, unrelated to a particular payment account, may be collected by a variety of techniques, and similarly stored within the databases 26 and 30.

In some embodiments, cardholders 24 involved in the transactions described herein are prompted to agree to legal terms associated with their payment accounts, for example, during enrollment in such payment accounts, etc. As such, the cardholder 24 may voluntarily agree to allow the merchants 12, the issuers 18, the interchange network 16, etc., to utilize data collected during enrollment and/or collected relating to processing the transactions, subsequently for one or more of the purposes described herein.

In the exemplary embodiment, the interchange network 16 includes a plurality of data centers, such as the data center A and the data center B (e.g., data centers for redundancy, data centers in distant geographical locations for network efficiency, etc.). Each data center includes a respective data center server system, such as data center A server system 20 and data center B server system 28. The server systems 20 and 28 include a plurality of applications (shown in FIG. 2) that can be accessed by any of the merchants 12, the acquirers 14, the issuers 18, and/or the cardholders 24. The applications typically are accessed via one or more application programming interfaces (APIs (shown in FIG. 2)).

APIs, as used herein, are how various separate services work together to deliver a solution. For example, and without limitation, in online banking, when the cardholder 24 logs in, usually the first thing the cardholder sees is his or her account balance. To deliver that solution, fundamentally two separate banking functions (or applications) work together (e.g., a login service and account balance service) to allow the cardholder 24 to see how much money he or she has in the account. How those two (2) services manage to work together is through an API. Example Mastercard APIs include, for example, Automatic Billing Updater (ABU), BIN Table Resource, MDES, Merchant Identifier, Cardless ATM, Mastercard Send, Masterpass, etc.

Referring back to FIG. 1, in the exemplary embodiment, the server systems 20 and 28 are configured to allow data, such as the transaction data, to be stored by a group of computers, and updated by one or more members of the group. While the interchange network 16 is illustrated as a single component in FIG. 1, it should be appreciated that the interchange network 16 may be a network of distributed computers or data centers, each coupled to the payment card network system 10, for example, via the network 22. For example, and without limitation, each of data centers A and B may be geographically remote from each other data center, or they may be housed in a single data center but be physically separate databases.

The off-line scheduler 32 is configured to determine a change window (e.g., a time period) for taking one or more of the plurality of applications associated with the server systems 20 and 28 off-line. In particular, the off-line scheduler 32 analyzes the applications (shown in FIG. 2) to determine which of the one or more APIs map to the application. For each of the applications, the off-line scheduler 32 performs a failure analysis on the APIs that map to the application to determine whether any of the APIs are single point of failure (SPOF) APIs. Based on the API failure analysis, the off-line scheduler 32 assigns a priority level to the application. The off-line scheduler 32 analyzes the historical data corresponding to the volume of network traffic for the APIs. Based on the application priority level and the historical network traffic data, the off-line scheduler 32 determines a change window for taking each respective application off-line that will reduce a negative impact on the operations of, for example, the merchant 12, acquirer 14, issuer 18, cardholder 24, etc.

While only one merchant 12, acquirer 14, interchange network 16, and issuer 18 are shown in FIG. 1 (for ease of reference), it should be appreciated that a variety of other embodiments may include multiple ones of these parties in various combinations.

Figure 2:
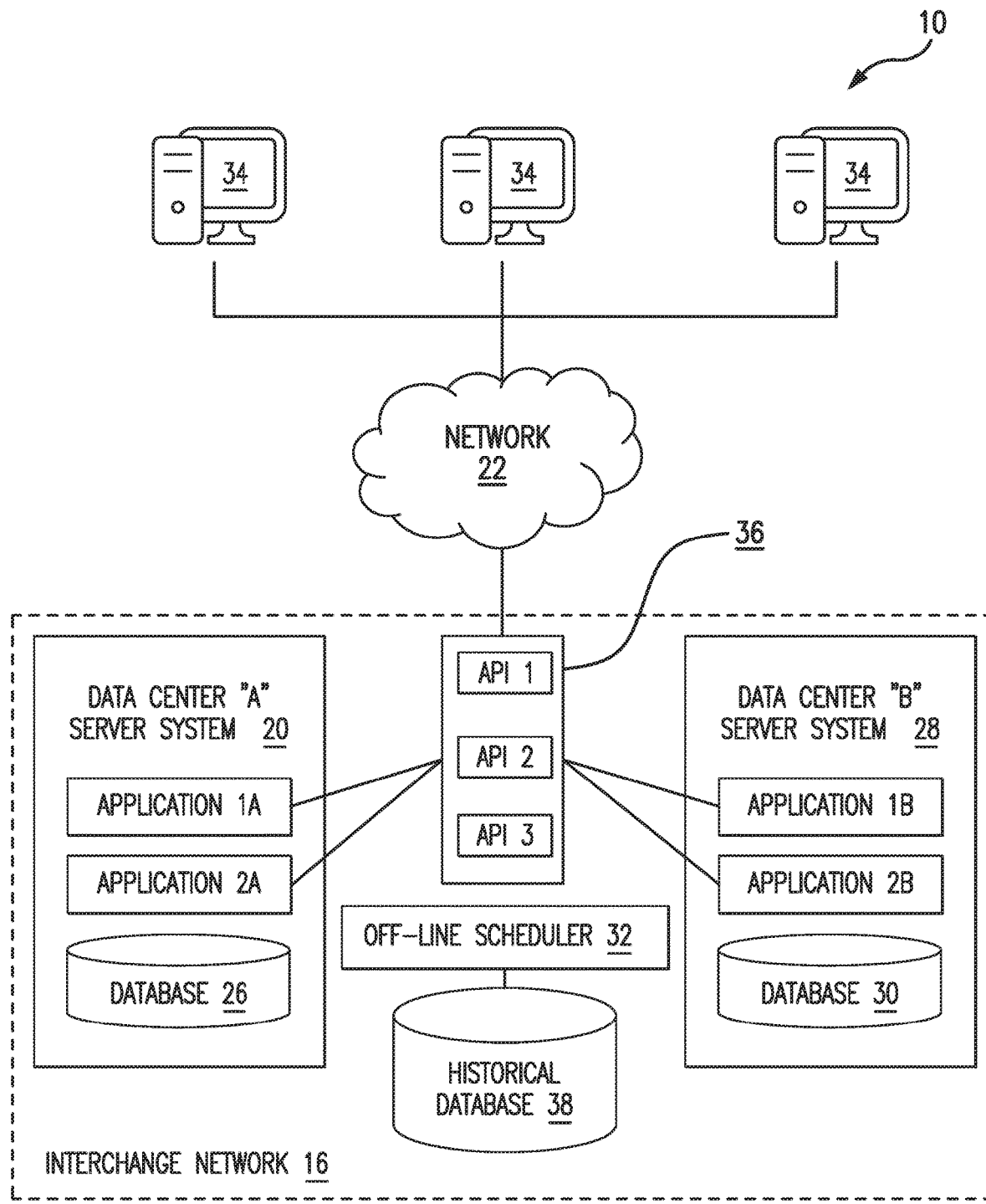
FIG. 2 is a block diagram of the interchange network shown in FIG. 1.

FIG. 2 is a block diagram of the interchange network 16 of the payment card network system 10 (shown in FIG. 1). In the exemplary embodiment, the interchange network 16 includes an API system 36 encompassing a plurality of APIs, such as, and without limitation, an API 1, an API 2, and an API 3. Each of the APIs 1, 2, and 3, are configured to communicate with or otherwise interface with one or more applications. As shown in FIG. 2, each of the data centers A and B contain two (2) applications, applications 1A and 2A, and applications 1B and 2B, respectively. It is noted that applications 1A and 1B are substantially the same and perform substantially the same functions. The designations "A" and "B" with respect to the application numbers are used to designate the respective data centers associated with the applications. Accordingly, applications 2A and 2B are substantially the same and perform substantially the same functions. While only two (2) applications and three (3) APIs are shown in FIG. 2, it is noted that the interchange network 16 may include any number of applications and APIs.

In the exemplary embodiment, one or more computing devices 34 (e.g., a merchant point-of-sale device, an acquirer computing device, an issuer computing device, and the like) communicate with at least one of the data centers A and B via the network 22 and one or more APIs 1, 2, and 3. The computing devices 34 include, for example, general purpose personal computers (e.g., personal computers and/or laptop computers running various versions of Microsoft Windows®, Apple MacOS, etc. operating systems) and/or workstations (e.g., professional computing systems running any various versions of commercially-available UNIX, LINUX, etc. operating systems). The computing devices 34 may include, for example, one or more software applications, including one or more database client and/or server applications, web browser applications, etc. Alternatively, the computing devices 34 may be any other computing device, including, for example, a thin-client computer, Internet-enabled mobile computing devices, personal digital assistants, etc. capable of communicating via the network 22 and/or displaying and navigating web pages, etc. Although three (3) computing devices 34 are shown in FIG. 2, it should be noted that any number of computing devices 34 may be included.

In the exemplary embodiment, the interchange network 16 determines to which of the data centers A and B to route a respective one of the computing devices 34 API messages or communications. For example, in one suitable embodiment, the interchange network 16 may route communications from a respective one of the computing devices 34 to a data center that is geographically nearest to the computing device 34. In alternative embodiments, the interchange network 16 may determine an appropriate data center based on a volume of network traffic at each of the data centers, a processing load of each of the data centers, other performance metrics, and the like.

The interchange network 16 includes a historical database 38 storing, for example, historical network traffic data corresponding to each of the components of the interchange network, including: (i) the APIs 1, 2, and; (ii) the applications 1A, 1B, 2A, and 2B; and (iii) the data center server systems 20 and 28. The off-line scheduler 32 can retrieve information from the historical database 38 for use in determining change widows for the applications 1A, 1B, 2A, and 2B for maintenance, updates, etc.

Figure 3:
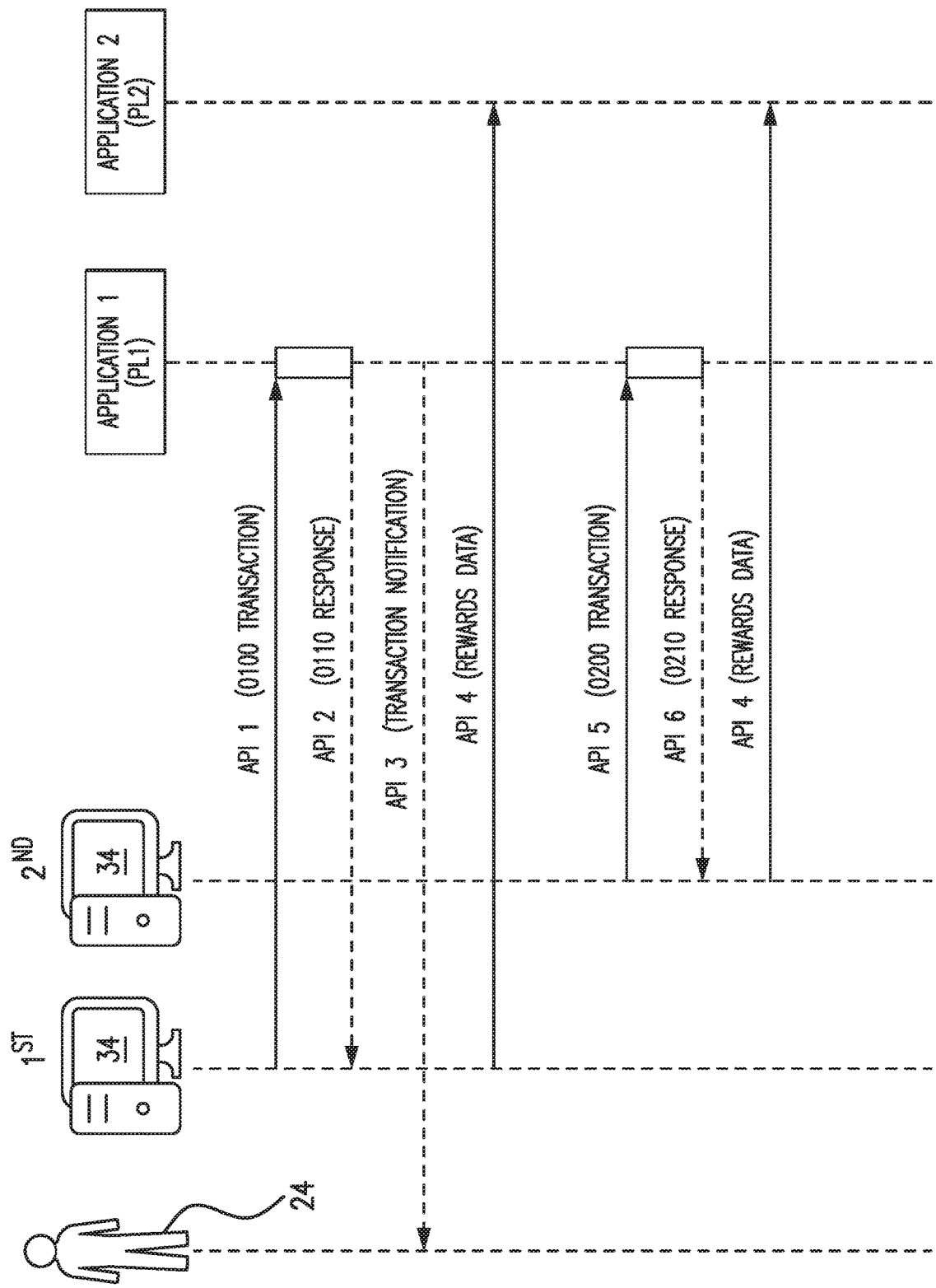
FIG. 3 is a flowchart of various example API actions that may be performed by one or more computing devices for accessing applications of the data centers shown in FIG. 1, according to one embodiment of the present invention.

FIG. 3 is a flowchart of various example API actions that may be performed by one or more of the computing devices 34 for accessing the applications of the data centers, according to one embodiment of the present invention. The exemplary flowchart includes two (2) computing devices 34, an application 1, an application 2, and several APIs, such as APIs 1-6. The applications 1 and 2 correspond to the applications 1A/1B and applications 2A/2B (shown in FIG. 2). The APIs may be configured to transmit and to respond to data transmissions and/or queries, and to otherwise participate in the processing of payment transactions. For instance, the APIs may be configured to communicate via interchange protocols established by the International Organization for Standardization (ISO) and to respond to and act based on the inclusion and values of data elements of the transaction data provided in connection with commands exchanged between devices.

In the exemplary embodiment, a first one of the computing devices 34 may be performing a payment transaction. For example, and without limitation, the first computing device 34 may be an acquirer, such as the acquirer 14 (shown in FIG. 1). The first computing device 34, using API 1, transmits an authorization request message (e.g., a message type indicator (MTI) 0100 message) to the application 1, which may be a transaction processing application, for example. After processing the request, the application 1, using API 2, returns an authorization request response message (e.g., an MTI 0110 message) to the first computing device 34. Furthermore, the application 1 may transmit a transaction notification message to the cardholder 24 using, for example, the API 3. It is noted that API 2 and API 3 are dependent upon API 1 in that neither the response message or the transaction notification message are generated and transmitted unless a request message is received by the application 1 via the API 1. Thus, in the exemplary embodiment, the API 1 may be designated as a single point of failure (SPOF) API. If API 1 fails, each of the APIs 2 and 3 fail.

As illustrated in FIG. 3, the second one of the computing devices 34 may also be performing a payment transaction. For example, and without limitation, the second computing device 34 may also be an acquirer, such as the acquirer 14. The second computing device 34, using the API 5, transmits a financial transaction request message (e.g., an MTI 0200 message) to the application 1. After processing the request, the application 1, via the API 6, returns a financial transaction request response message (e.g., an MTI 0210 message) to the second computing device 34. It is noted that the API 6 is dependent upon the API 5. That is, the financial transaction response message is not generated and transmitted unless a financial transaction request message is received by the application 1 via the API 5. Thus, the API 5, like the API 1 above, may be designated as a single point of failure (SPOF) API. If the API 5 fails, the API 6 necessarily fails also.

Furthermore, in FIG. 3, each of the first and second computing devices 34 (e.g., the acquirers 14) transmit rewards data to the application 2 via the API 4. In the exemplary embodiment, the API 4 rewards data message is an asynchronous message that does not require a response. A such, application 2 does not provide a response. It is noted that none of the API calls to the application 2 (e.g., via the API 4) are dependent on any other API call to the application 2, thus, such API calls are not SPOF calls.

In the exemplary embodiment, the application 1 is designated a priority level 1 (PL1) application based on it having one or more SPOF APIs communicating and/or interacting therewith. The application 2, on the other hand, is a priority level 2 (PL2) application because there are no SPOF API calls being performed at the application 2. Thus, in the exemplary embodiment, each API operating in the interchange network 16 is mapped to its one or more applications (e.g., the applications 1 and 2). Any application that has an SPOF API mapping thereto is considered a PL1 application. Otherwise, as described herein, the application is a PL 2 application.

Exemplary Computer Systems

Figure 4:
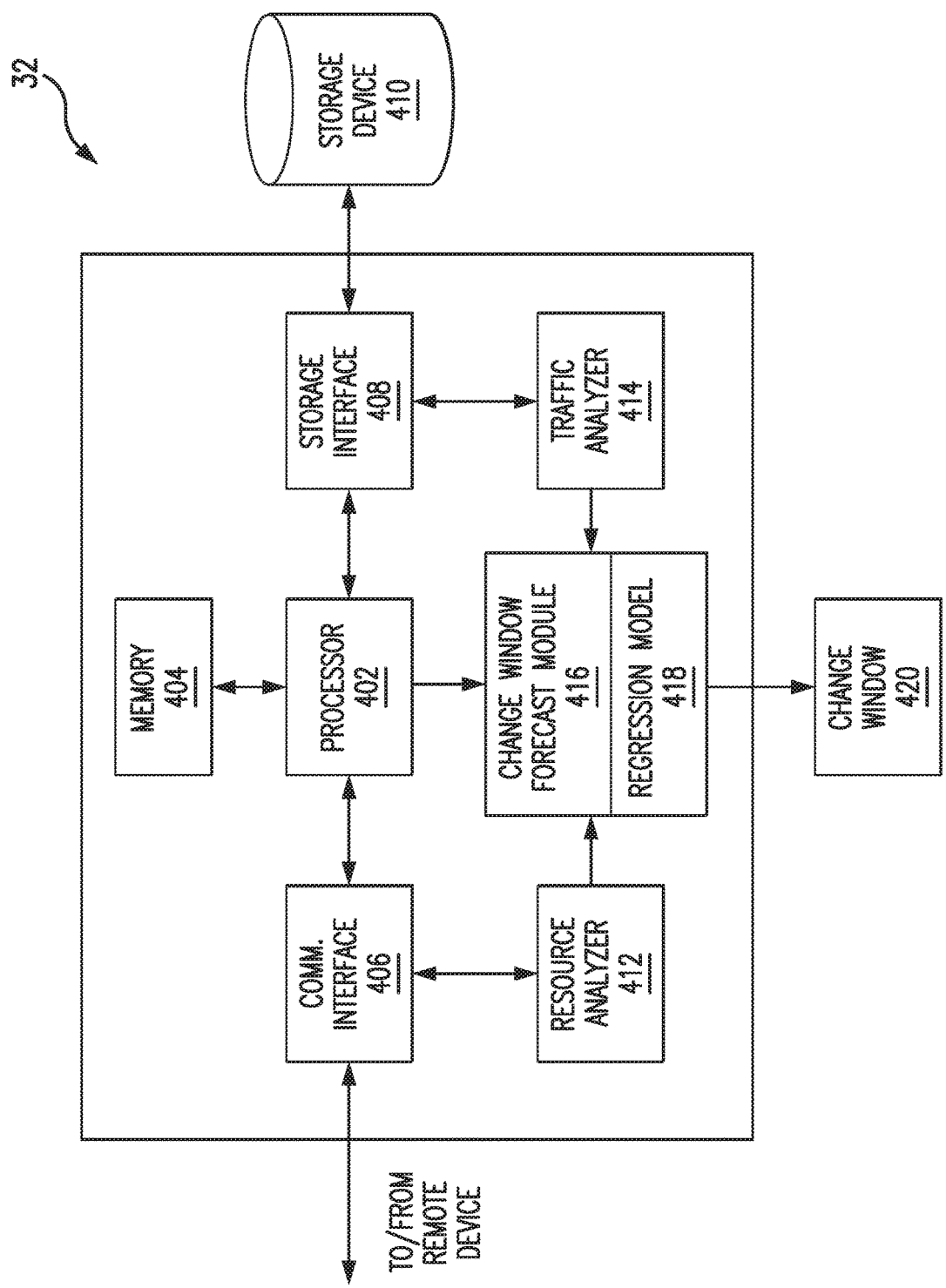
FIG. 4 is an example configuration of the off-line scheduler shown in FIG. 1.

FIG. 4 is an example configuration of the off-line scheduler 32 for determining a change window 420 for taking an application (broadly, a resource), such as one or more of the applications 1A, 1B, 2A, and 2B (shown in FIG. 2), off-line. As used herein, the term "off-line" includes removing all communication from the resource such that the resource is made unavailable to all network traffic, API calls, etc. There are many reasons that one or more of the data center resources may need to be taken off-line. For example, and without limitation, the resource(s) may be taken off-line for regularly scheduled maintenance, updates, repairs, etc. However, when a resource is taken off-line, the network traffic and connections associated with the off-line resource must be rerouted to the equivalent resource on a different data center server system. For example, referring to FIG. 2, if the application 1A is taken off-line, its associated network communications are rerouted to the application 1B on the data center B server system 28. As such, the off-line scheduler 32 needs to determine a change window (e.g., a date and time) for taking the resource off-line, wherein the change window is defined during a period that reduces a negative customer impact (e.g., impact on the operations of a merchant, acquirer, issuer, cardholder, etc.).

In the exemplary embodiment, the off-line scheduler 32 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the off-line scheduler 32, such as UNIX, LINUX, Microsoft Windows®, etc. It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.).

In the example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 402 is operatively coupled to a communication interface 406 such that the off-line scheduler 32 can communicate with a remote device, such as one or more of the data center server systems 20 and 28 (shown in FIG. 2). For example, the communication interface 406 may receive communications originating from one or more computing devices 34 via the Internet and intended for one or more of the applications 1A, 1B, 2A, and 2B, as illustrated in FIG. 2.

The processor 402 is operatively coupled to the storage device 410. The storage device 410 is any computer-operated hardware suitable for storing and/or retrieving data. In some embodiments, the storage device 410 is integrated in the off-line scheduler 32. In other embodiments, the storage device 410 is external to the off-line scheduler 32 and is similar to the historical database 38 (shown in FIG. 2). For example, the off-line scheduler 32 may include one or more hard disk drives as the storage device 410. In other embodiments, the storage device 410 is external to the off-line scheduler 32 and may be accessed by a plurality of computing devices. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

The off-line scheduler 32 also includes a resource analyzer 412. The resource analyzer 412 is a module and/or component configured to analyze the resources associated with the interchange network 16, such as the applications 1A, 1B, 2A, and 2B and the plurality of APIs (e.g., APIs 1, 2, and 3) and generate resource analysis data. The resource analyzer 412 can map each API to the various applications. It is noted that each respective API may map to more than one (1) application. In addition, the resource analyzer 412 can determine API dependencies within each application, for example via synchronous and asynchronous messages, calls, and the like.

The off-line scheduler 32 also includes a traffic analyzer 414. The traffic analyzer 414 is a module and/or component configured to analyze historical network traffic data corresponding to the plurality of APIs (e.g., APIs 1, 2, and 3) and applications (e.g., applications 1A, 1B, 2A, and 2B) in order to generate historical traffic data. As part of analyzing the historical network traffic data, the traffic analyzer 414 may analyze a number of messages or calls per unit of time, a period between an initial message or call and a response from the interchange network 16, a processor load or utilization percentage per time period, and/or any other predetermined performance metric based on network traffic.

The resource analyzer 412 and the traffic analyzer 414 are operatively coupled to a change window forecast module 416. The change window forecast module 416 receives the resource analysis data and the historical traffic data and applies the data to a regression model 418. The regression model 418 processes the data such that forecasted events for future periods may be generated. The change window forecast module 416 applies forecasts or predictions generated by the regression model 418 to forecast a period (e.g., the change window 420) for taking one or more of the resources off-line. While the example embodiment shows one (1) change window 420, it is noted that the change window forecast module 416 may determine more than one change window for a single resource, a different change window for each resource, and/or at least one change window for a portion of the resources, and at least one second change window for another portion of the resources.

Figure 5:
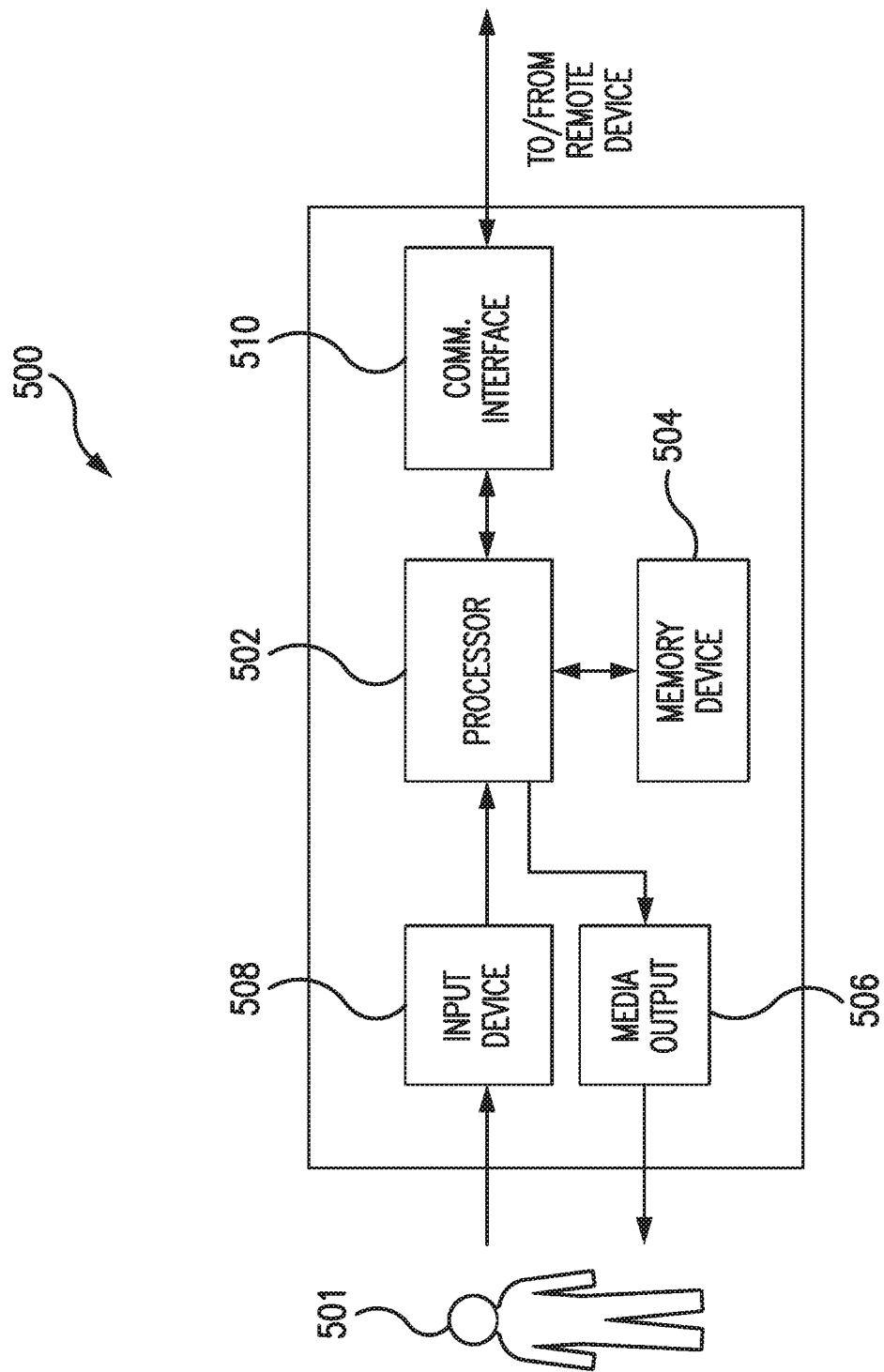
FIG. 5 is an example configuration of a computer system, which may be used by a merchant, acquirer, and/or issuer shown in FIG. 1.

FIG. 5 is an example configuration of a computer system 500 operated by a user 501. In some embodiments, the computer system 500 is a merchant or acquirer computing device 34, a merchant POS terminal, a contactless ATM, and/or a consumer computing device. In the example embodiment, the computer system 500 includes a processor 502 for executing instructions. In some embodiments, executable instructions are stored in a memory device 504. The processor 502 includes one or more processing units, for example, a multi-core processor configuration. The memory device 504 is any device allowing information such as executable instructions and/or written works to be stored and retrieved. The memory device 504 includes one or more computer readable media.

In the example embodiment, the processor 502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 500 may be widely deployed, it may be impractical to manually update software for each computing system 500. Therefore, the system 10 (shown in FIG. 1) may, in some embodiments, provide a mechanism for automatically updating the software on the computing system 500. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computer system 500 also includes at least one media output component 506 for presenting information to the user 501. The media output component 506 is any component capable of conveying information to the user 501. In some embodiments, the media output component 506 includes an output adapter such as a video adapter and/or an audio adapter. An output adapter is operatively coupled to the processor 502 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computer system 500 includes an input device 508 for receiving input from the user 501. The input device 508 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 506 and the input device 508.

The computer system 500 may also include a communication interface 510, which is communicatively connectable to a remote device such as the off-line scheduler 32 (shown in FIG. 2), the interchange network 16 (shown in FIG. 1), and the like. The communication interface 510 may include, for example, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 504 are, for example, computer readable instructions for providing a user interface to the user 501 via the media output component 506 and, optionally, receiving and processing input from the input device 508. A user interface may include, among other possibilities, a web browser and a client application. Web browsers enable users, such as the user 501, to display and interact with media and other information typically embedded on a web page or a website from the server system 30. A client application allows the user 501 to interact with a server application associated with a merchant.

Exemplary Computer-Implemented Methods

Figure 6:
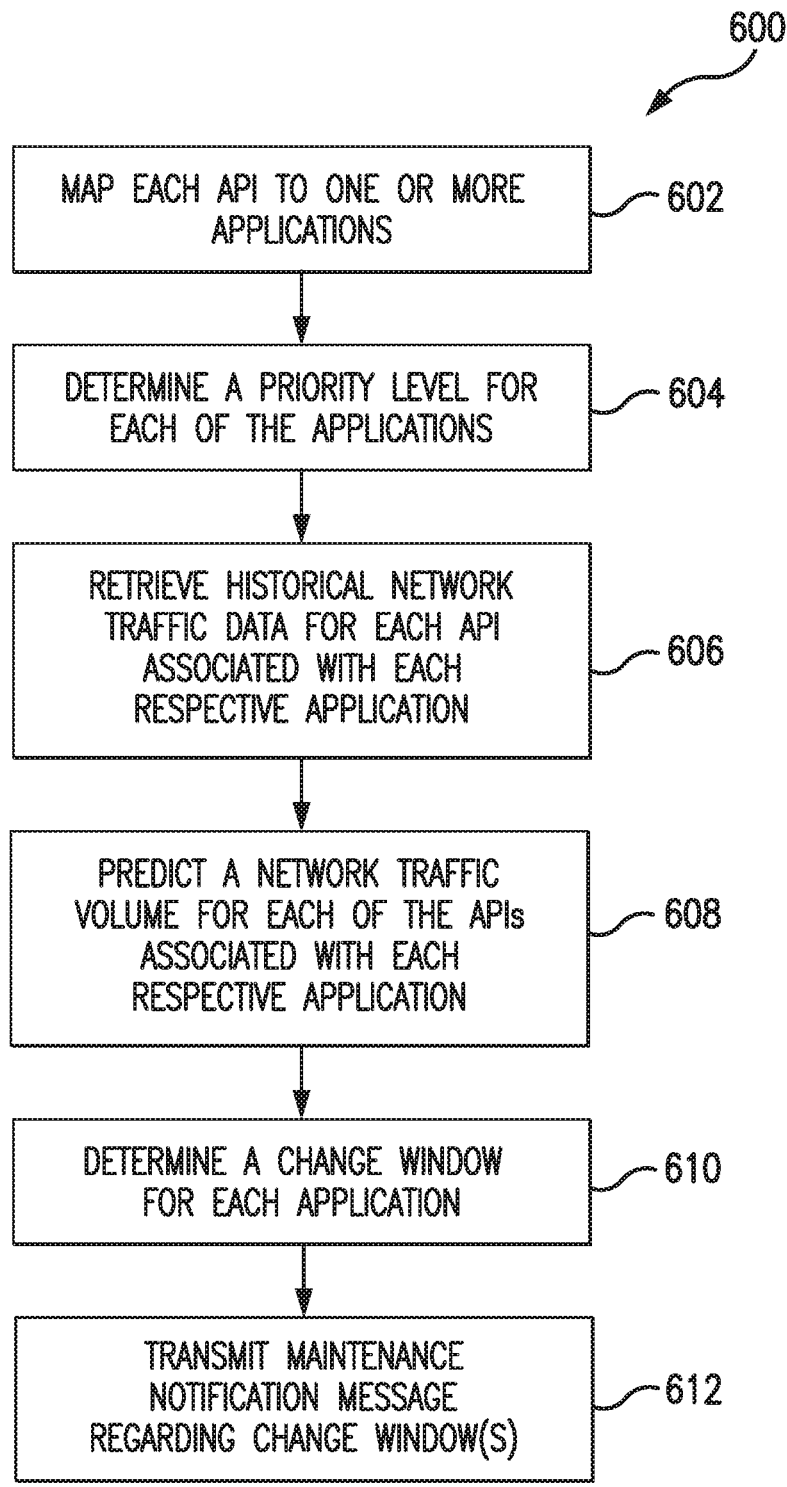
FIG. 6 is a flowchart illustrating an exemplary computer-implemented method for determining a change window, in accordance with one embodiment of the present disclosure.

FIG. 6 is a flowchart illustrating an exemplary computer-implemented method 600 for determining a change window, in accordance with one embodiment of the present disclosure. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-5. In one embodiment, the computer-implemented method 600 is implemented by the off-line scheduler 32 (shown in FIGS. 1,2, and 4). In the exemplary embodiment, the computer-implemented method 600 relates to determining a change window for taking a system resource off-line while reducing the negative impact to customers. While operations within the computer-implemented method 600 are described below regarding the off-line scheduler 32, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, at operation 602, an off-line scheduler, such as the off-line scheduler 32 (shown in FIG. 1), maps each of a plurality of APIs of the interchange network 16 (shown in FIG. 1) to one or more applications of the interchange network 16. The plurality of APIs, such as the APIs 1-6 (shown in FIG. 3), communicate or interface with one or more of the applications 1 and 2 (shown in FIG. 3). As shown in FIG. 2, applications 1 and 2 are operative on each of the data centers A and B, wherein application 1 is referred to as application 1A on data center A and application 1B on data center B, and application 2 is referred to as application 2A on data center A and application 2B on data center B. The resource analyzer 412 monitors each of the APIs 1-6 and determines to which of the applications 1 and 2 the messages or calls are directed. This information is stored as resource analysis data by the resource analyzer 412. In one embodiment, the resource analyzer 412 may also monitor each of the applications to determines which APIs are interacting therewith. By comparing the API monitoring data to the application monitoring data, in one suitable embodiment, the resource analyzer 412 can perform a check or validation on the API mapping to confirm that the resource analysis data is accurate.

At operation 604, the off-line scheduler 32 determines a priority level for each of the applications (e.g., applications 1 and 2) of the interchange network 16. For example, and without limitation, the resource analyzer 412 analyzes the APIs directed to a respective application to determine whether the API messages or calls are synchronous messages or calls requiring, for example, a response. For example, with reference to FIG. 3, API 1 sends an 0100 transaction message to application 1 (this could be application 1A or 1B, based on network traffic routing determined by the interchange network 16). The API 1 message requires a response in order for the transaction to continue. As such, the Application 1 transmits a response message using an API 2. Thus, the API 1 may be designated as a single point of failure (SPOF) API. If API 1 fails, API 2 also fails. The resource analyzer 412 designates any application having an SPOF API as a priority level 1 (PL1) application. The resource analyzer 412 designates any application that does not include an SPOF API as a priority level 2 (PL2) application.

At operation 606, for a given application, the off-line scheduler 32 retrieves historical network traffic data for each API associated with the application. In particular, the traffic analyzer 414 retrieves from the historical database 38 (shown in FIG. 1) traffic data for each API of the application for a predetermined period. The predetermined period can be any desired period including, for example, three (3) months, six (6) months, same day of the week for the last six (6) months, etc. In one suitable embodiment, the predetermined period is a rolling thirteen (13) month period taken from the date of the analysis by the traffic analyzer 414. The traffic analyzer 414 applies a regression model, such as the regression model 418 (shown in FIG. 4), to the historical traffic data. The regression model 418 determines a function that can be used by the change window forecast module 416 to forecast (or predict) network traffic for a predetermined future period (or service period).

At operation 608, the off-line scheduler 32 predicts a network traffic volume for each of the APIs associated with or mapped to the application. In particular, the change window forecast module 416 applies the determined functions for the APIs associated with or mapped to the application using the predetermined service period. Thus, each function determines a predicted network traffic volume for its associated API during the predetermined service period. The combination of predicted network traffic volumes for all the application APIs equates to a predicted network traffic volume for the associated application.

At operation 610, based on the predicted network traffic volume over a predetermined service period and the priority level of the application(s), the off-line scheduler 32 determines the change window 420 for taking the application(s) off-line. For example, and without limitation, if both applications 1 and 2 are scheduled for maintenance or updating during an upcoming service period, the off-line scheduler 32 determines that application 1A at data center A is a PL1 application and has a predicted peak traffic volume between 1 pm-7 pm CST, and that application 2A is a PL2 application and has a predicted peak traffic between 7 am-3 pm CST. The corresponding applications 1B and 2B at data center B may have predicted peak traffic volumes between 9 pm-3 am CST and 3 pm-11 pm CST, respectively. Data center B, for example, may be located in a geographic location having approximately an eight (8) hour time difference with respect to data center A. Based on this example, the off-line scheduler 32 would determine a change window with minimum risk based on the priorities of each application and the least impact time.

For example, in the example described above, if a three (3) hour change window is required to update Applications 1A, 2A, 1B, and 2B, the off-line scheduler 32 may first determine that 1 pm-7 pm CST and 9 pm-3 am CST are not available due to those periods being peak traffic periods for PL1 applications 1A and 1B. Thus, the off-line scheduler 32 may select from a period between 7 pm-9 pm CST and 3 am-1 pm CST for the change window. However, because PL2 applications 2A and 2B also need to be serviced, the off-line scheduler 32 may also determine that 7 am-3 pm CST and 3 pm-11 pm CST are not available due to those periods being peak traffic periods for PL2 applications 2A and 2B. Thus, the off-line scheduler 32 may now select from a period between 3 am-7 am CST for the change window. It should be noted that the above example is exemplary only. The peak traffic periods of the applications may overlap, may not overlap, may extend for longer and/or shorter periods, and the like. In addition, the application priorities and peak periods may require that more than one change window be defined for one or more applications during the service period. As such, the off-line scheduler 32 can determine one or more change windows with minimum risk based on the priorities of each application and the least impact time.

At operation 612, the off-line scheduler 32 transmits one or more maintenance notification messages regarding the change window to customers of the interchange network 16 (e.g., merchants, acquirers, issuers, cardholders, and the like) that may be impacted by the applications being taken off-line. For example, in one embodiment, the customers may elect to receive maintenance notifications only for PL1 applications, PL2 applications, or a combination of PL1 and PL2 applications. The off-line scheduler 32 may receive the customer notification preferences and store them in a database. After the one or more change windows are determined by the off-line scheduler 32, the maintenance notification messages may be transmitted to the customers, based on the notification preferences retrieved from the database, using, for example, the communication interface 406 (shown in FIG. 4) of the off-line scheduler 32.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computer-implemented method performed by a computing system, the computing system including a historical database, an off-line scheduler, a resource analyzer, a traffic analyzer, a change window forecast module, and an application programming interface (API) system including a plurality of APIs, the method comprising:
   monitoring, by the resource analyzer, the plurality of APIs and a plurality of applications associated with the plurality of APIs;
   receiving, at the API system via an electronic network, a plurality of API calls, each API call being associated with a respective one of the plurality of APIs;
   mapping, by the resource analyzer, each API to one or more applications of the plurality of applications based on the one or more applications to which each API call is directed;
   storing, by the resource analyzer, the mapping as resource analysis data in a memory component;
   based on the resource analysis data, determining, by the resource analyzer, a priority level for each respective application of the plurality of applications, the determining comprising:
      analyzing each API mapped to the respective application; and
      determining, for each API mapped to the respective application, any API dependencies based on the API calls associated with the API, the determining comprising:
         determining whether the API calls associated with the API are synchronous or asynchronous API calls, wherein the API is a single point of failure when the API calls are synchronous API calls; and
         when the API is a single point of failure, determining that the respective application is a priority level one (1) application,
         otherwise, determining that the respective application is a priority level two (2) application;
   for each respective application, retrieving, by the traffic analyzer from the historical database, historical network traffic data for each API mapped to the respective application;
   for each respective application, predicting, by the off-line scheduler, a network traffic volume for each API mapped to the respective application; and
   based on the predicted network traffic volume and the priority level of each of the applications, determining, by the change window forecast module, a change window for taking the applications off-line.

2. The computer-implemented method in accordance with claim 1, further comprising:
   applying, by the change window forecast module, a regression model to the historical network traffic data; and
   based on the regression model, determine a respective function for each of the APIs,
   each function operable to forecast network traffic for a respective API for a predetermined future period.

3. The computer-implemented method in accordance with claim 2,
   said operation of predicting a network traffic volume comprising applying the respective function determined for each API mapped to the respective application to a predetermined service period.

4. The computer-implemented method in accordance with claim 1,
   said operation of mapping the one or more APIs comprising one or more of the following:
      monitoring each of the APIs to determine which of the applications a respective API is associated with, the result being API monitoring data; and
      monitoring each of the applications to determine which of the APIs interact therewith, the result being application monitoring data.

5. The computer-implemented method in accordance with claim 4, further comprising comparing, by the resource analyzer, the API monitoring data to the application monitoring data to confirm that the mapping of the APIs to the applications is accurate.

6. The computer-implemented method in accordance with claim 1, further comprising transmitting, by the off-line scheduler, one or more maintenance notification messages regarding the change window to one or more customers that may be impacted by the applications being taken off-line.

7. The computer-implemented method in accordance with claim 6, further comprising receiving, from one or more of the customers by the off-line scheduler, notification preferences corresponding to an election to receive one or more maintenance notification messages.

8. The computer-implemented method in accordance with claim 7, further comprising storing, by the off-line scheduler, the notification preferences in a database, the notification preferences being associated with a respective customer from which it was received.

9. The computer-implemented method in accordance with claim 8, said operation of transmitting one or more maintenance notification messages comprising:
   retrieving the notification preferences from the database; and
   based on the notification preferences, transmitting the maintenance notification messages to the respective customers who elected to receive the maintenance notification messages.

10. A computing system comprising:
   an application programming interface (API) system comprising a plurality of APIs;
   a data center server comprising a plurality of applications associated with the plurality of APIs;

a historical database comprising historical network traffic data corresponding to said plurality of APIs, said plurality of applications, and said data center server; and an off-line scheduler comprising a resource analyzer, a traffic analyzer, a change window forecast module, and a processor in communication with said API system, said data center server, and said historical database, said processor programmed to:

monitor, via the resource analyzer, the plurality of APIs and the plurality of applications;

receive, from the API system via an electronic network, a plurality of API calls, each API call being associated with a respective one of the plurality of APIs, map, via the resource analyzer, each API to one or more of applications of the plurality of applications based on the one or more applications to which each API call is directed, store, via the resource analyzer, the mapping as resource analysis data in a memory component;

based on the resource analysis data, determine, by the resource analyzer, a priority level for each respective application of the plurality of applications, the determining comprising said processor programmed to:

analyze each API mapped to the respective application; and determine, for each API mapped to the respective application, any API dependencies based on the API calls associated with the API, the determining comprising:

determining whether the API calls associated with the API are synchronous or asynchronous API calls, wherein the API is a single point of failure when the API calls are synchronous API calls; and when the API is a single point of failure, determining that the respective application is a priority level one (1) application, otherwise, determining that the respective application is a priority level two (2) application, for each respective application, retrieve, via the traffic analyzer from the historical database, historical network traffic data for each API mapped to the respective application, for each respective application, predict, via the off-line scheduler, a network traffic volume for each API mapped to the respective application, and based on the predicted network traffic volume and the priority level of each of said applications, determine, via the change window forecast module, a change window for taking said applications off-line.

11. The computing system in accordance with claim 10, said processor further programmed to:

apply, via the change window forecast module, a regression model to the historical network traffic data, and based on the regression model, determine a respective function for each of the APIs, each function operable to forecast network traffic for a respective API for a predetermined future period.

12. The computing system in accordance with claim 11, said processor being further programmed, as part of the operation of predicting a network traffic volume, to apply the respective function determined for each API mapped to the respective application to a predetermined service period.

13. The computing system in accordance with claim 10, said processor being further programmed, as part of the operation of mapping each API of said plurality of APIs, to perform one or more of the following:

monitor each of said APIs to determine which of said applications a respective API is associated with, the result being API monitoring data, and monitor each of said applications to determine which of said APIs interact therewith, the result being application monitoring data.

14. The computing system in accordance with claim 13, said processor further programmed to compare, via the resource analyzer, the API monitoring data to the application monitoring data to confirm that the mapping of said APIs to said applications is accurate.

15. The computing system in accordance with claim 10, said processor further programmed to transmit, via the off-line scheduler, one or more maintenance notification messages regarding the change window to one or more customers that may be impacted by said applications being taken off-line.

16. The computing system in accordance with claim 15, said processor further programmed to receive, from one or more of the customers via the off-line scheduler, notification preferences corresponding to an election to receive one or more maintenance notification messages.

17. The computing system in accordance with claim 16, said processor further programmed to store, via the off-line scheduler, the notification preferences in a database, the notification preferences being associated with a respective customer from which it was received.

18. The computing system in accordance with claim 17, said processor being further programmed, as part of the operation of transmitting one or more maintenance notification messages, to:

retrieve the notification preferences from the database, and based on the notification preferences, transmit the maintenance notification messages to the respective customers who elected to receive the maintenance notification messages.

* * * * *